(12) United States Patent
Weiss

(10) Patent No.: US 11,432,105 B1
(45) Date of Patent: Aug. 30, 2022

(54) LOCATION-TRIGGERED NOTIFICATION SYSTEM

(71) Applicant: WALGREEN CO., Deerfield, IL (US)

(72) Inventor: Benjamin Weiss, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 17/143,353

(22) Filed: Jan. 7, 2021

Related U.S. Application Data

(63) Continuation of application No. 16/720,721, filed on Dec. 19, 2019, now Pat. No. 10,917,741.

(51) Int. Cl.
*H04W 24/00* (2009.01)
*H04W 4/021* (2018.01)
*G06Q 30/02* (2012.01)
*H04W 4/029* (2018.01)

(52) U.S. Cl.
CPC ........ *H04W 4/021* (2013.01); *G06Q 30/0267* (2013.01); *H04W 4/029* (2018.02)

(58) Field of Classification Search
CPC ....... H04W 4/02; H04W 4/021; H04W 4/029; H04W 64/00; H04W 76/02; H04W 88/02; H04W 92/02; G06Q 30/0267
USPC ....................................................... 455/456.3
See application file for complete search history.

(56) References Cited

U.S. PATENT DOCUMENTS

2020/0076942 A1   3/2020  Shepherd et al.

*Primary Examiner* — Temica M Beamer
(74) *Attorney, Agent, or Firm* — Marshall, Gerstein & Borun LLP; Randall G. Rueth

(57) ABSTRACT

A method for facilitating location-based notification display by an application at a mobile device includes, while the application is in a launched state, receiving from the mobile device a location of the mobile device, determining one or more entity locations based on the location of the mobile device, and causing the mobile device to register the one or more entity locations. The method also includes, while the application is in a background state, causing the mobile device to register one or more location-triggered notifications, wherein each location-triggered notification of the one or more location-triggered notifications is associated with a corresponding entity location of the one or more entity locations.

20 Claims, 7 Drawing Sheets

LOCATION-TRIGGERED NOTIFICATION SYSTEM

CROSS-REFERENCE TO RELATED APPLICATIONS

This is a continuation of U.S. patent application Ser. No. 16/720,721, entitled "Location-Triggered Notification System" and filed on Dec. 19, 2019, the entirety of which is hereby incorporated by reference herein.

FIELD OF THE DISCLOSURE

The present disclosure generally relates to electronic messaging and, more specifically, to technologies that generate location-triggered notification.

BACKGROUND

For marketing and/or other reasons, companies and related entities have desired to send customers notifications via the customers' mobile devices or other personal electronic devices when those customers are in the vicinity of a store. Typically, current techniques for accomplishing this rely on mobile device users giving a mobile device application (or "app") permission to track their location even while the application is running in the background. However, only a small percentage of an application's user base are typically willing to give that level of permission. Instead, most users allow an application to track their locations only while the application is "in use," meaning the application is running in the foreground and the user is choosing to actively use the application in that moment. Because of these permissions, companies, marketers, and/or other entities can, at best, set up a location notification with a geofence trigger at an application running on a customer's mobile device or other personal electronic device while the application is in use. This allows the companies, marketers, and/or other entities to register store locations such that, when a customer comes into any of the geofences associated with those store locations, a notification appears at the customer's mobile device or other personal electronic device. However, because the companies, marketers, and/or other entities do not know when the customer will next visit a store, the notifications set while the application is "in use" may become "stale" and show an outdated message.

BRIEF SUMMARY

In one aspect, a method, implemented by a computing system, for facilitating location-based notification display by an application at a mobile device includes, while the application is in a launched state, (1) receiving, from the mobile device, a location of the mobile device, (2) based on the location of the mobile device, determining one or more entity locations, and (3) causing the mobile device to register the one or more entity locations. The method also includes, while the application is in a background state, causing the mobile device to register one or more location-triggered notifications, wherein each location-triggered notification of the one or more location-triggered notifications is associated with a corresponding entity location of the one or more entity locations.

In another aspect, a method, implemented by a mobile device, for facilitating location-based notification display by an application at the mobile device includes, while the application is in a launched state, (1) sending a location of the mobile device to a computing system, (2) receiving one or more entity locations from the computing system, and (3) registering the one or more entity locations. The method also includes, while the application is in a background state, receiving one or more messages from the computing system, and in response to receiving the one or more messages, registering one or more location-triggered notifications, wherein each location-triggered notification of the one or more location-triggered notifications is associated with a corresponding entity location of the one or more entity locations.

In yet another aspect, a computing system for facilitating location-based notification display by an application at a mobile device includes one or more processors and a program memory storing executable instructions. When executed by the one or more processors, the instructions cause the computing system to: (1) while the application is in a launched state, receive, from the mobile device, a location of the mobile device, determine one or more entity locations based on the location of the mobile device, and cause the mobile device to register the one or more entity locations; and (2) while the application is in a background state, cause the mobile device to register one or more location-triggered notifications, wherein each location-triggered notification of the one or more location-triggered notifications is associated with a corresponding entity location of the one or more entity locations.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

The embodiments described herein relate to, inter alia, techniques for triggering an up-to-date, location-based notification at a mobile device (e.g., smartphone, tablet, etc.) of a customer when the customer enters the vicinity of an entity location. A specific application (or "app") that is installed and executing on the customer's mobile device determines when the customer is within the vicinity and displays the notification. To determine when an entity location is near, for example, the mobile device application may listen for beacons via a short-range communication protocol (e.g., Bluetooth, WiFi, near field communications (NFC), etc.) from an entity location, or determine that a geolocation of the mobile device is within a vicinity of an entity location.

When the mobile device app detects a beacon, or otherwise determines that the geolocation of the mobile device is within a vicinity of an entity location, the mobile device application displays a notification. The notification may be stored at the mobile device and correspond to (e.g., include information relevant to) the entity location.

The notification may be generated by a server associated with the entity location and located either at or remote from the entity location. When the application of the mobile device is in a launched state (e.g., when a user of the mobile device has launched and is using the application), the server may receive a notification including a location of the mobile device. The server may then send instructions to the mobile device to cause the mobile device application to register one or more entity locations. The one or more entity locations may be location based (e.g., entity locations nearest to the mobile device) and/or user based (e.g., entity locations frequently visited by the user). The server may then, when the application is in a launched state or back in a background state, send instructions to the mobile device to cause the application to register one or more notifications associated with each of the one or more locations.

The server may also, when the application is in the launched state or back in the background state, send instructions to the mobile device to cause the application to update the one or more notifications by deregistering an old notification and registering a new one associated with the entity location. When the mobile device enters a vicinity of the entity location, the application may display the associated notification.

The techniques described herein provide improvements over previous techniques for location-based notifications (e.g., over conventional location-based push notifications). For example, the described techniques allow for up-to-date notifications to be provided to the user even when the user only gives permission to share location when the application is in use.

Figure 1:
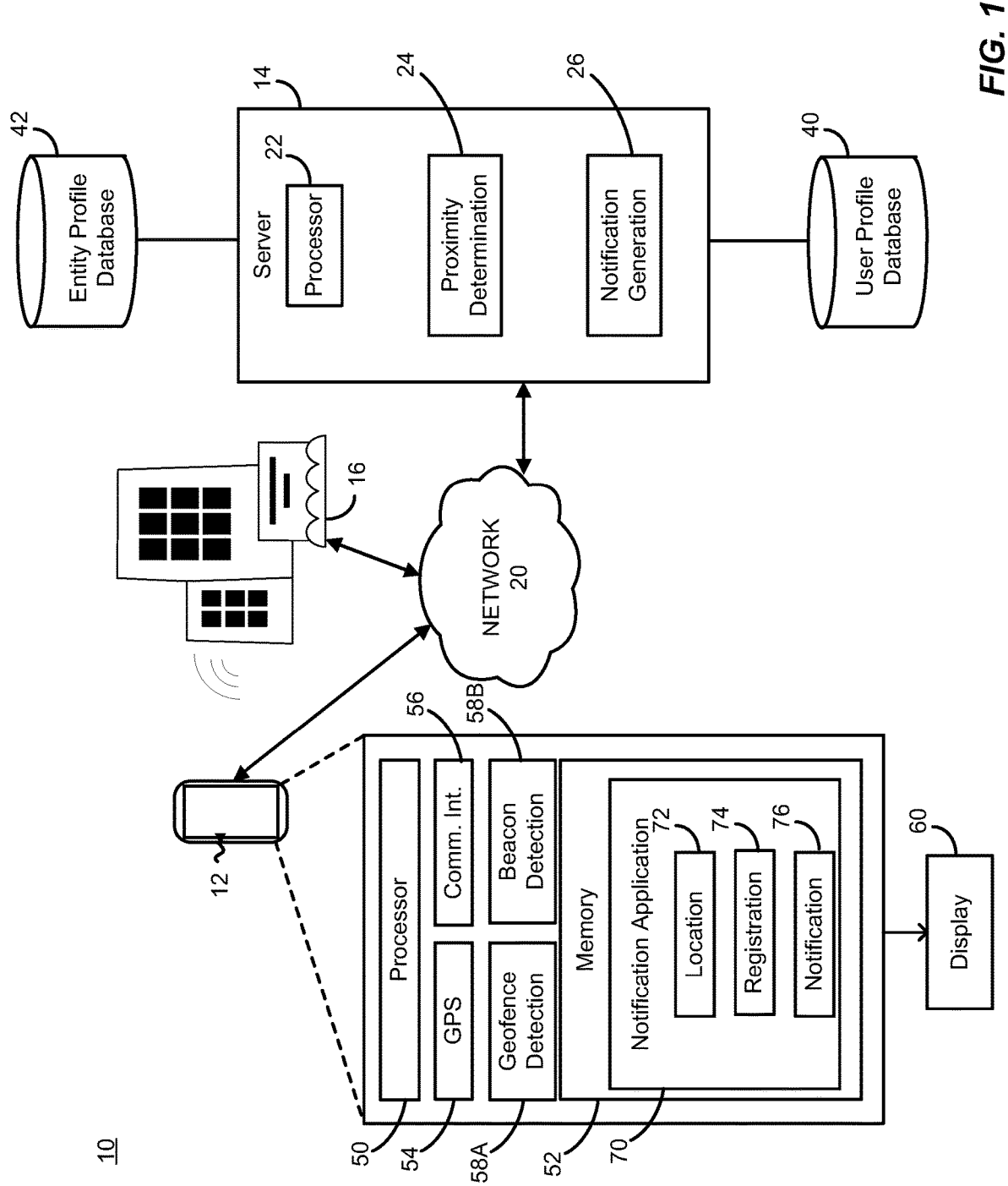
FIG. 1 depicts an example system in which a location-triggered notification may be generated and displayed, according to one embodiment.

FIG. 1 depicts an example environment 10 in which techniques for generating and displaying location-triggered notifications may be implemented, according to one embodiment. As seen in FIG. 1, the example environment 10 includes a mobile device 12, a server 14, and an entity location 16. The entity location 16 may be a brick-and-mortar store, or other retail environment, that has a physical presence. Mobile device 12, and possibly a server or other computer system associated with entity location 16, is/are communicatively coupled to server 14 via a network 20. Network 20 may be a single communication network, or may include multiple communication networks of one or more types (e.g., one or more wired and/or wireless local area networks (LANs), and/or one or more wired and/or wireless wide area networks (WANs) such as the Internet). While FIG. 1 shows only one mobile device 12, it is understood that many different mobile devices (of different users), each similar to mobile device 12, may be in remote communication with server 14. Additionally, while FIG. 1 shows only one entity location 16, it is understood that many different entity locations, each similar to entity location 16, may be in remote communication with server 14.

Mobile device 12, and entity location 16, may all be remote from server 14, and mobile device 12 may also be remote (at least at certain times) from entity location 16. A computer system of entity location 16 may be coupled to server 14 via network 20, or a different network not shown in FIG. 1. Server 14 may be an individual server, a group (e.g., cluster) of multiple servers, or another suitable type of computing device or system.

Server 14 includes a processor 22. Processor 22 may include any suitable number of processors and/or processor types (e.g., one or more central processing units (CPUs)). Generally, processor 22 is configured to execute software instructions stored in one or more memories (e.g., stored in a persistent memory such as a hard drive or solid state memory) of server 14.

The software instructions executed by processor 22 include the instructions of a proximity detection unit 24, and a notification generation unit 26. The processor 22 may detect a setting at a mobile device (e.g., mobile device 12) indicating that the user has permitted an application to access the location of the mobile device when the application is in a launched state. Proximity detection unit 24 is generally configured to request from a mobile device a location of the mobile device and, based on that location, determine one or more corresponding entity locations. Proximity detection unit 24 may request a location of the mobile device in response to processor 22 detecting that the application is in a launched state. The corresponding entity locations may be the one or more entity locations located closest to the mobile device at the time of the request, for example.

Additionally, proximity detection unit 24 is generally configured to cause a mobile device to register the corresponding entity location(s). Proximity detection unit 24 may cause/trigger the registration at a given mobile device by sending one or more messages, instructions, or notifications (e.g., silent push notifications) to the mobile device. Additionally, in some embodiments, proximity detection unit 24 may cause/trigger the registration at a mobile device by causing the mobile device to register one or more geographic areas that include the entity location(s). Proximity detection unit 24 may send one or more messages, instructions, or notifications when an application at a mobile device (e.g., mobile device 12) of a user is in a launched state.

Optionally, the proximity detection unit 24 may be configured to, based on historical user data rather than a user's current location, determine one or more additional entity locations, and cause the mobile device to register the one or more additional entity locations. Again, the proximity detection unit 24 may cause/trigger the registration at the mobile device by sending one or more messages, instructions, or notifications (e.g., silent push notifications) to the mobile device. The historical user data is data associated with a user of a mobile device, and may be determined by identifying the mobile device and the user of the mobile device based on user profile data stored in user profile database 40. User profile database 40 may be stored in a local, persistent memory of server 14, or may be stored in a persistent memory of a computer system of entity location 16 or another suitable location, and in some embodiments may include a number of separate databases (e.g., some stored at server 14, and others stored at a computer system of entity location 16). User profile database 40 may contain information associated with the shopping history of users of mobile devices (e.g., purchase history, frequented stores, coupon use history, frequency of visits). Depending on the embodiment and/or scenario, user profile database 40 may further contain any type of information associated with people, such as demographic data (e.g., age, gender, height, etc.), medical records, financial account data, etc. Proximity determination unit 24 may only access the data in user profile database 40 for users who have expressly agreed to share their personal data for that purpose, for example.

Notification generation unit 26 is generally configured to cause a mobile device (e.g., mobile device 12) to register one or more location-triggered notifications, wherein each location-triggered notification is associated with a corresponding entity location of the one or more entity locations (e.g., entity location 16). The content/message of a location-triggered notification associated with a first entity may be different from that of a location-triggered notification associated with a second entity, for example, and the content/message may be generated (e.g., by the corresponding entity) based on entity data, historical user data, environmental data, date data, and/or other data/information. Notification generation unit 26 may access historical user data from user profile database 40 (e.g., only for users who have expressly agreed to share their personal data for that purpose), including the historical user data associated with a user of a mobile device (e.g., as determined by identifying the mobile device and determining the user of the mobile device based on user profile data stored in user profile database 40).

Entity data may be stored at the entity profile database 42. Entity profile database 42 may be stored in a local, persistent memory of server 14, or may be stored in a persistent memory of a computer system of entity location 16, and in some embodiments may include a number of separate databases (e.g., some stored at server 14, and others stored at a computer system of entity location 16). Entity profile database 42 may contain current information associated with an entity location (e.g., current promotions, current coupons, current stock of items).

In some embodiments, notification generation unit 26 accesses environmental data and/or time data (e.g., from the National Weather Service, an internal clock of the server, and/or from temperature and or other sensors). Notification generation unit 26 may then generate notifications based on factors such as current weather patterns, time of day, day of year, expected weather events, and so on.

Notification generation unit 26 may send one or more notifications to the mobile device when an application at a mobile device (e.g., mobile device 12) of a user is in a launched state, and/or when the application is in a background state, irrespective of the user's location sharing settings (e.g., even if the user has opted not to share location when the application is not running). For example, notification generation unit 26 may cause a mobile device to register one or more original location-triggered notifications while the application is in a launched state. Then, while the application is in a background state, notification generation unit 26 may cause the mobile device to deregister the one or more original location-triggered notification and register one or more new location-triggered notifications. Notification generation unit 26 may cause the registration or reregistration by sending one or more messages, instructions, or notifications (e.g., silent push notifications).

Mobile device 12 is associated with (e.g., in the possession of, configured to provide secure access to, etc.) a particular user, who may be a customer, or potential customer, of an entity location, for example entity location 16. Mobile device 12 may be a personal computing device of that user, such as a smartphone, a tablet, smart glasses, or any other suitable device or combination of devices (e.g., a smart watch plus a smartphone) with wireless communication capability. In the embodiment of FIG. 1, mobile device 12 includes a processor 50, a memory 52, a global positioning system (GPS) unit 54, a communication interface 56, a geofence detection unit 58A, a beacon detection unit 58B, and a display 60. As with processor 22, processor 50 may include any suitable number of processors and/or processor types. Processor 50 may include one or more CPUs and one or more graphics processing units (GPUs), for example. Generally, processor 50 is configured to execute software instructions stored in memory 52. Memory 52 may include one or more persistent memories (e.g., a hard drive and/or solid state memory) and stores one or more applications, including a notification application 70.

Notification application 70 may be an app provided by a specific company (e.g., a pharmacy, a grocery store, a restaurant, etc.) that is associated with multiple locations (e.g., different retail stores). Additionally, notification application 70 may provide additional functionality as compared to what is discussed herein, such as online ordering of products, curb-side pickup of products, and/or remote consultations with company staff. Notification application 70 includes a location unit 72, a registration unit 74, and a notification unit 76, and is described in more detail below. Memory 52 may also include one or more persistent memories configured to store data that is used and/or generated by notification application 70.

GPS unit 54 includes hardware, firmware and/or software that is generally configured to use satellite signals for positioning/locating mobile device 12, e.g., using known satellite positioning technologies. In other embodiments, GPS unit 54 may be a different (non-GPS) type of global navigation satellite system (GNSS) unit, or may use non-satellite positioning technologies (e.g., trilateration based on nearby WiFi access points, etc.).

Communication interface 56 includes hardware, firmware and/or software that is generally configured to communicate with other devices (including at least network 20) using one or more communication protocols. For example, communication interface 56 may be configured to transmit and receive data using a Bluetooth protocol, a WiFi (IEEE 802.11 standard) protocol, a near-field communication (NFC) protocol, and/or a cellular (e.g., LTE, WiMAX, etc.) protocol. Geofence detection unit 58A may be configured to detect WiFi signals as well as determine latitude/longitude location, for example, from GPS unit 54. Beacon detection unit 58B may be configured to detect Bluetooth signals, including at least Bluetooth beacons, for example, via communication interface 56. While both geofence detection unit 58A and beacon detection unit 58B are shown, mobile device 12 may include only one of geofence detection unit 58A and beacon detection unit 58B. Display 60 may use any suitable display technology (e.g., LED, OLED, LCD, etc.), and may enable a user to interact with graphical user interfaces (GUIs) provided by mobile device 12.

The software instructions executed by processor 50 include the instructions of location unit 72, registration unit 74, and notification unit 76. When executing the instructions of the notification application 70, the processor 50 may cause the mobile device 12 to send to the server 14, via the communication interface 56 and the network 20, an indication whenever the user of mobile device 12 launches the application 70 at the mobile device 12, wherein launching the application 70 changes the application 70 from a background state to a launched state. Processor 50 may send the indication in response to a user setting at application 70 indicating that a location of the mobile device 12 may be accessed when the application 70 is in a launched (e.g., "in use" or "running") state.

Location unit 72 is generally configured to send a location of the mobile device 12 to server 14 via communication interface 56 using network 20. Location unit 72 may be configured to send the location only when the application 70 is in a launched state (e.g., if the user has set location sharing permissions for application 70 in that manner).

Registration unit 74 is generally configured to receive one or more entity locations and, in response, register the one or more entity locations at the mobile device 12. Additionally, registration unit 74 is further configured to receive one or more notification messages, and in response to receiving the one or more messages, register one or more location-triggered notifications, wherein each location-triggered notification is associated with a corresponding entity location of the one or more entity locations. Registration unit 74 may register such notifications while the application 70 is in a launched state, and/or while the applications 70 is in a background state, regardless of any user settings for location sharing. In one scenario, for example, registration unit 74 registers one or more original location-triggered notifications while the application is in a launched state. Then, while the application is in a background state, registration unit 74 deregisters the original location-triggered notification(s) and register one or more new/updated location-triggered notifications. Registration unit 74 registers or reregisters based on one or more messages, instructions, or notifications (e.g. silent push notifications) from the server 14 and/or other servers or computing systems.

Notification unit 76 is generally configured to, in response to detecting that the mobile device 12 is proximate to a particular entity location (e.g., entity location 16), present a location-triggered notification associated with that particular entity location on the display 60.

Server 14 may be associated with (e.g., owned/maintained by) a company that owns and/or manages entity location 16. In some embodiments, for example, the computing system of entity location 16 discussed above may be or include server 14. In some embodiments, the environment 10 includes additional components not shown in FIG. 1. As just one of many possible examples, another server or computer system, not shown in FIG. 1, may act as an intermediary between server 14 and entity location 16.

Figure 2:
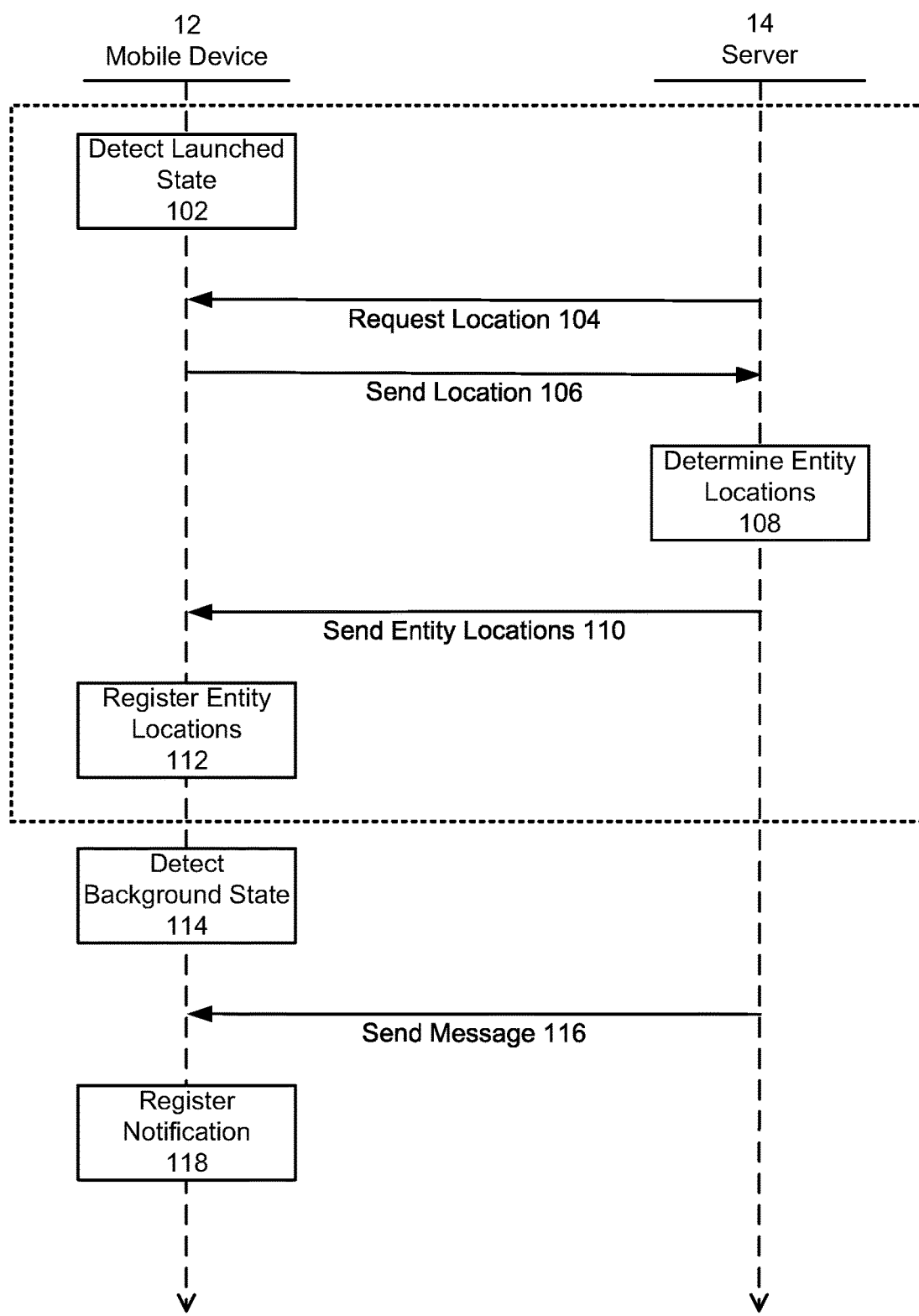
FIG. 2 is a sequence diagram illustrating exemplary operation of the system of FIG. 1, according to one embodiment.

Operation of the environment 10 will now be described with reference to the example embodiment represented in the sequence diagram 100 of FIG. 2. The sequence diagram 100 corresponds to a time when processor 50 of mobile device 12 is executing notification application 70. As seen in FIG. 2, the sequence diagram 100 includes a first time-line corresponding to mobile device 12 of FIG. 1 and a second time-line corresponding to server 14 of FIG. 1. Solid horizontal lines with arrows in FIG. 2 represent communications using a communication protocol (e.g., via network 20 of FIG. 1). The dashed-line rectangle in FIG. 2 represents the period of time the application is in the launched state.

In sequence diagram 100, in process 102, mobile device 12 detects that the notification application 70 is in a launched state. Process 102 may happen immediately upon (e.g., be triggered by) the user launching application 70, for example. Mobile device 12 may also determine at process 102 that application 70 is configured (e.g., user-configured) such that application 70 may access a location of mobile device 12 while (or only while) in the launched state. Next, server 14 may request 104 a location of mobile device 12. In response to the request 104, mobile device 12 sends 106 the location of mobile device 12 to server 14.

At process 108, server 14 determines one or more entity locations (e.g., based on entity location proximity, as discussed above in connection with proximity determination unit 24), and server 14 sends 110 the determined entity location(s) to mobile device 12. Mobile device 12, at process 112, then registers the one or more entity locations.

At process 114, mobile device 12 detects that the notification 70 is in a background state (e.g., if the user has not used application 70 for a predetermined time, or if the user closes a GUI of application 70 that is presented on display 60, etc.). Next, server 14 sends 116 a message to mobile device 12 that causes (e.g., instructs) the application 70 to register one or more notifications associated with the one or more entity locations. At process 118, mobile device 12 (i.e., application 70) registers the one or more notifications in response to the received message. In other scenarios, server 14 may send 116 the message while application 70 is in the launched state. Because the notification registration process does not require access to the current location of mobile device 12, however, application 70 can register the notifications from server 14 irrespective of whether application 70 is in a launched or background state.

Figure 3:
FIG. 3 depicts an example user interface on which a location-triggered notification is provided, according to one embodiment and scenario.

One example of a notification that application 70 may register is shown in FIG. 3. As seen in FIG. 3, a user interface 200 (e.g., presented on display 60) includes a push notification 202 with the message "WELCOME TO WALGREENS." In some embodiments, this message may be presented at the mobile device 12 in response to mobile device 12 being proximate to a particular Walgreens location.

Figure 4:
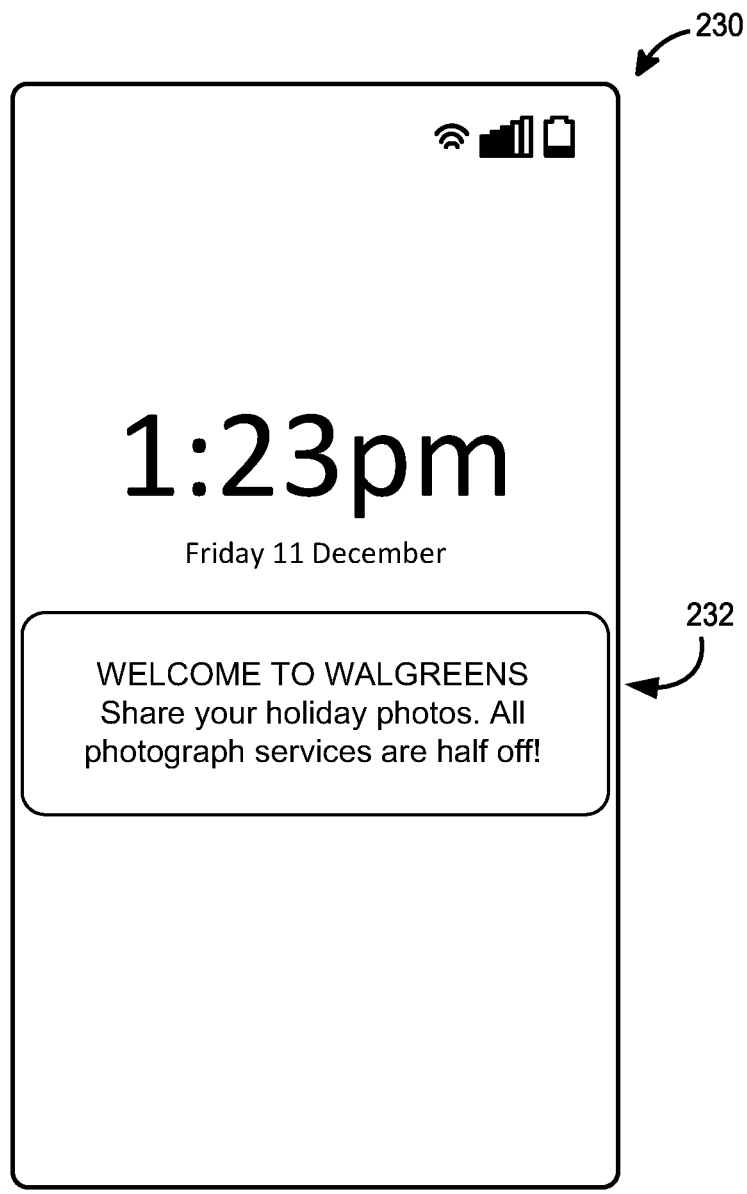
FIG. 4 depicts another example user interface on which a location-triggered notification is provided, according to one embodiment and scenario.

Another example of a push notification is shown in FIG. 4. As seen in FIG. 4, a user interface 230 (e.g., presented on display 60) includes a push notification 232 with the message "WELCOME TO WALGREENS Share your family holiday photos. All photograph services are half off!" In some embodiments, this message may be presented at mobile device 12 in response to the mobile device 12 being proximate to a particular Walgreens location (e.g., a Walgreens location that happens to have a 50% discount on photography services at the time). The notification 232 may be generated further based on entity data as well as environmental data (e.g., a date that falls in winter, or near Christmas, etc.).

Figure 5:
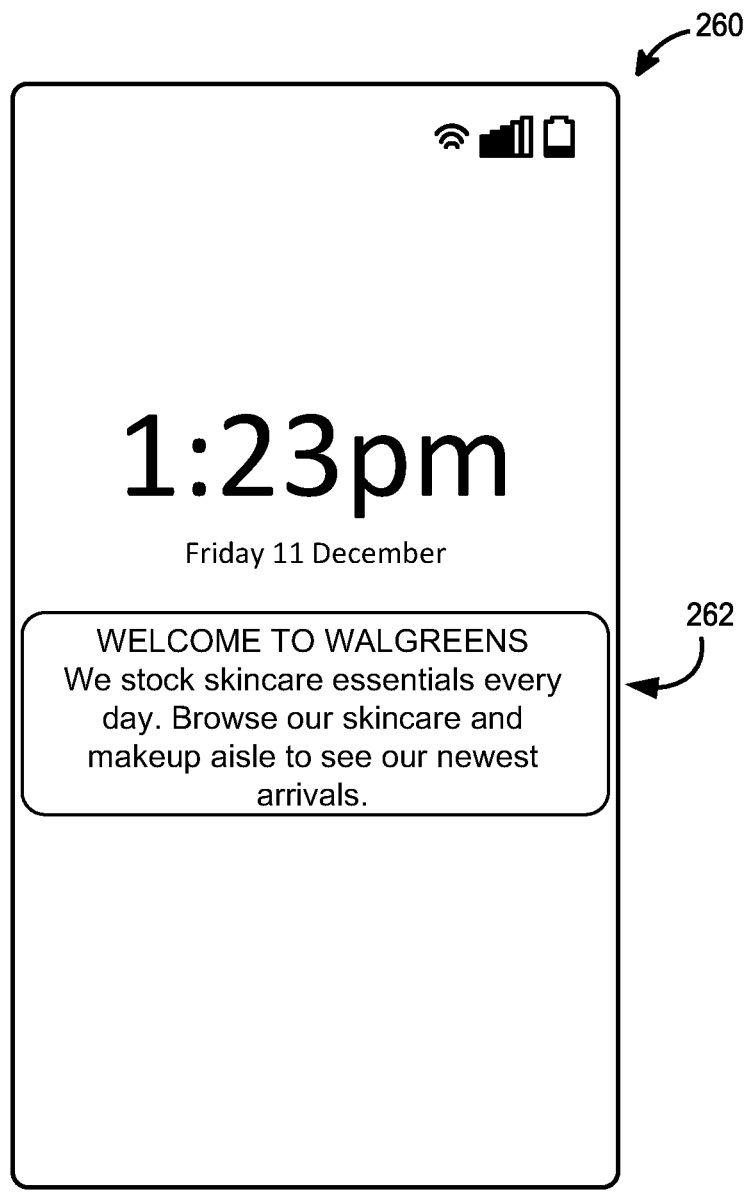
FIG. 5 depicts still another example user interface on which a location-triggered notification is provided, according to one embodiment and scenario.

Another example of a push notification is shown in FIG. 5. As seen in FIG. 5, a user interface 260 (e.g., presented on display 60) includes a push notification 262 with the message "WELCOME TO WALGREENS We stock skincare essentials every day. Browse our skincare and makeup aisle to see our newest arrivals." In some embodiments, this message may be presented at mobile device 12 in response to the mobile device 12 being proximate to a particular Walgreens location. The notification 262 may be generated further based on customer data such as customer preferences (e.g., data indicating that the user of mobile device 12 has frequently bought skin care products in the past).

In some embodiments, the notification (e.g., notification 202, 232, or 262) also triggers (i.e., causes mobile device 12 to generate) an audio alert in order to further draw the user's attention to the message. The audio alert may be a custom sound, or may simply be audio that accompanies all push notifications based on user or default system settings, for example.

Figure 6:
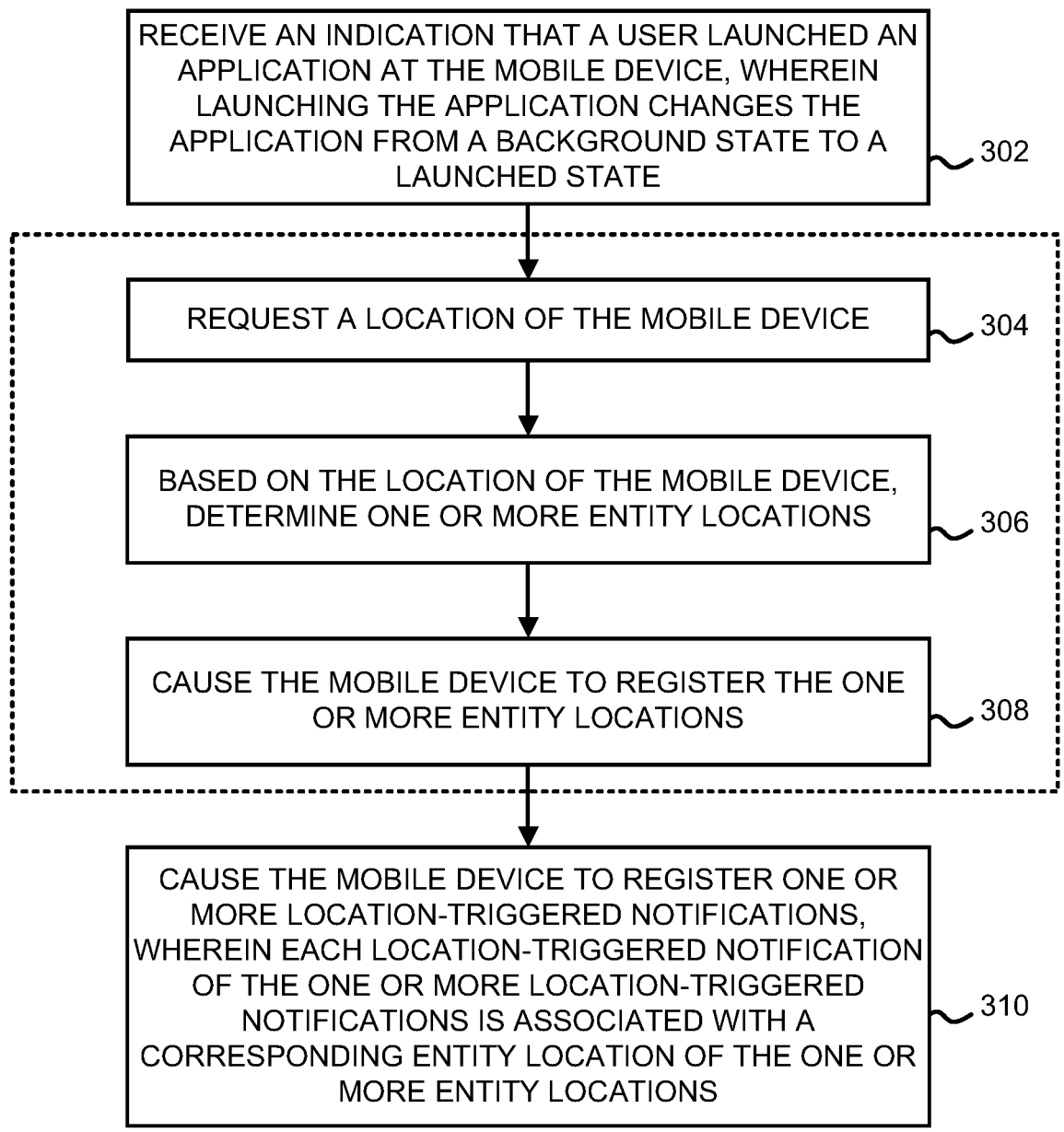
FIG. 6 is a flow diagram of an example method for generating and sending a location-triggered notification, according to one embodiment, which may be implemented by a mobile device.

FIG. 6 is a flow diagram of an example method 300 for location-based notification display. The method 300 may be implemented by one or more processors of a computer system, such as processor 22 of server 14 in FIG. 1, for example. The dashed-line rectangle in FIG. 6 represents the period of time an application, such as application 70 running on mobile device 12, is in the launched state.

In the method 300, an indication that a user launched an application at the mobile device (e.g., application 70 at mobile device 12) is received from the mobile device at block 302. Launching the application changes the application from a background state to a launched state. Next, while the application is in the launched state, at block 304, server 14 may request a location of the mobile device.

While the application is still in the launched state, at block 306, server 14 may, based on the location of the mobile device, determine one or more entity locations. Block 306 may include determining the entity location(s) based on current proximity of the mobile device to the entity location (s), for example, and possibly also based on historical user data (e.g., as discussed above in connection with proximity determination unit 24).

While the application is still in the launched state, at block 308, the mobile device is caused to register the one or more entity locations. At a later time, at block 310 and when the application is in the background state, the mobile device is caused to register one or more location-triggered notifications. Each location-triggered notification is associated with a corresponding entity location of the one or more entity locations that were registered at block 308.

Figure 7:
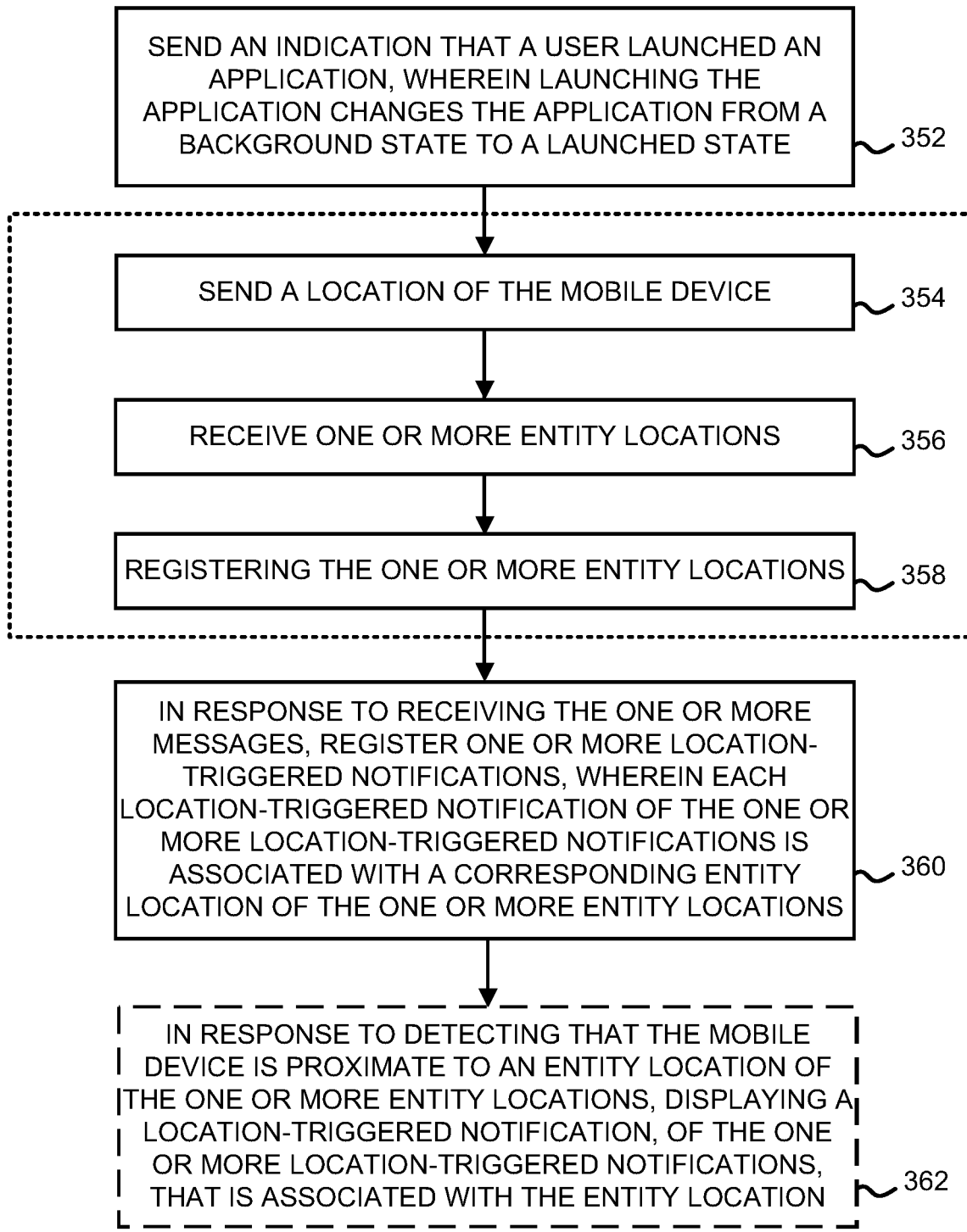
FIG. 7 is a flow diagram of an example method for receiving and displaying a location-triggered notification, according to one embodiment, which may be implemented by a server or other computing system.

FIG. 7 is a flow diagram of an example method 350 for location-based notification display. The method 350 may be implemented by one or more processors of a computer system, such as processor 50 of mobile device 12 in FIG. 1, for example. The dashed-line rectangle in FIG. 7 represents the period of time an application, such as application 70 running on mobile device 12, is in the launched state.

In method 350, at block 352, an indication that a user launched an application (e.g., application 70 at mobile device 12) is sent to a computing system (e.g., server 14). Launching the application changes the application from a background state to a launched state.

While the application is in the launched state, at block 354, a location of the mobile device is sent to the computing system. Thereafter, at block 356, one or more entity locations are received from the computing system. The entity locations may be those that the computing system determined to be relatively near to the mobile device at that time, and/or that the computing system identified based on historical user device, for example. Next, at block 358 and while the application is in the launched state, the one or more entity locations are registered.

At a later time, at block 360 and when the application is in the background state, and in response to receiving one or more messages, one or more location-triggered notifications are received from the computing system. Each location-triggered notification is associated with a corresponding entity location of the one or more entity locations received at block 356. Further, at block 362 and in response to detecting that the mobile device is proximate to an entity location, a location-triggered notification associated with the entity location may optionally be displayed (e.g., at the display 60 a via notification unit 76).

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for location-based notification display, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method, implemented by a computing system, for facilitating location-based notification display by an application at a mobile device, the method comprising:
while the application is in a launched state:
receiving, from the mobile device, a location of the mobile device;
based on the location of the mobile device, determining one or more entity locations;
causing the mobile device to register the one or more entity locations; and
while the application is in a background state:
causing the mobile device to register one or more location-triggered notifications, wherein each location-triggered notification of the one or more location-triggered notifications is associated with a corresponding entity location of the one or more entity locations.

2. The method of claim 1, further comprising:
while the application is in the launched state, causing the mobile device to register one or more original location-triggered notifications,
wherein causing the mobile device to register the one or more location-triggered notifications includes causing the mobile device to (i) deregister the one or more original location-triggered notifications, and (ii) register one or more new location-triggered notifications.

3. The method of claim 2, wherein causing the mobile device to deregister the one or more original location-triggered notifications and register the one or more new location-triggered notifications includes sending a silent push notification to the mobile device.

4. The method of claim 1, wherein a first location-triggered notification of the one or more location-triggered notifications is associated with a corresponding first entity location of the one or more entity locations, a second location-triggered notification of the one or more location-triggered notifications is associated with a corresponding second entity location of the one or more entity locations, and wherein the first location-triggered notification is different from the second location-triggered notification.

5. The method of claim 1, wherein the one or more entity locations are a first set of one or more entity locations, the one or more location-triggered notifications are a first set of one or more location-triggered notifications, and the method further comprises, while the application is in the launched state:
based on historical user data, determining a second set of one or more entity locations;
causing the mobile device to register the second set of one or more entity locations; and
causing the mobile device to register a second set of one or more location-triggered notifications, wherein each location-triggered notification of the second set of one or more location-triggered notifications is associated with a corresponding entity location of the second set of one or more entity locations.

6. The method of claim 1, further comprising generating each location-triggered notification of the one or more location-triggered notifications based on one or more of entity data, historical user data, environmental data, and date data.

7. The method of claim 1, wherein causing the mobile device to register the one or more entity locations comprises causing the mobile device to register one or more geographic areas that include the one or more entity locations.

8. The method of claim 1, further comprising:
detecting a setting of the mobile device indicating that the application may access the location of the mobile device when the application is in the launched state,
wherein requesting the location of the mobile device, determining the one or more entity locations, and causing the mobile device to register the one or more entity locations occur in response to detecting the setting and while the application is in the launched state.

9. A method, implemented by a mobile device, for facilitating location-based notification display by an application at the mobile device, the method comprising:
while the application is in a launched state:
sending a location of the mobile device to a computing system;
receiving one or more entity locations from the computing system; and
registering the one or more entity locations; and
while the application is in a background state:
receiving one or more messages from the computing system; and
in response to receiving the one or more messages, registering one or more location-triggered notifications, wherein each location-triggered notification of the one or more location-triggered notifications is associated with a corresponding entity location of the one or more entity locations.

10. The method of claim 9, further comprising:
while the application is in the launched state, registering one or more original location-triggered notifications,
wherein registering the one or more location-triggered notifications includes (i) deregistering the one or more original location-triggered notifications, and (ii) registering one or more new location-triggered notifications.

11. The method of claim 10, wherein deregistering the one or more original location-triggered notifications and registering the one or more new location-triggered notifications occurs in response to receiving a silent push location-triggered notification from the computing system.

12. The method of claim 9, wherein a first location-triggered notification of the one or more location-triggered notifications is associated with a corresponding first entity location of the one or more entity locations, a second location-triggered notification of the one or more location-triggered notifications is associated with a corresponding second entity location of the one or more entity locations, and wherein the first location-triggered notification is different from the second location-triggered notification.

13. The method of claim 9, wherein the one or more entity locations are a first set of one or more entity locations, the one or more location-triggered notifications are a first set of one or more location-triggered notifications, and the method further comprises:
receiving a second set of one or more entity locations from the computing system, the second set of one or more entity locations based on historical user data;
in response to receiving the second set of one or more entity locations, registering the second set of one or more entity locations; and
registering a second set of one or more location-triggered notifications, wherein each location-triggered notification of the second set of one or more location-triggered notifications is associated with a corresponding entity location of the second set of one or more entity locations.

14. The method of claim 9, wherein each location-triggered notification of the one or more location-triggered notifications is generated based on one or more of entity data, historical user data, environmental data, and date data.

15. The method of claim 9, wherein registering the one or more entity locations comprises registering one or more geographic areas that include the one or more entity locations.

16. The method of claim 9, further comprising:
detecting a setting indicating that the application may access the location of the mobile device when the application is in the launched state,
wherein sending the location of the mobile device, registering the one or more entity locations, and registering the one or more location-triggered notifications occur in response to detecting the setting and while the application is in the launched state.

17. The method of claim 9, further comprising:

in response to the one or more processors detecting that the mobile device is proximate to an entity location of the one or more entity locations, displaying a location-triggered notification, of the one or more location-triggered notifications, that is associated with the entity location.

18. A computing system for facilitating location-based notification display by an application at a mobile device, the computing system comprising:

one or more processors; and a program memory storing executable instructions that, when executed by the one or more processors, cause the computing system to:

while the application is in a launched state:
receive, from the mobile device, a location of the mobile device;
based on the location of the mobile device, determine one or more entity locations;
cause the mobile device to register the one or more entity locations; and while the application is in a background state:
cause the mobile device to register one or more location-triggered notifications, wherein each location-triggered notification of the one or more location-triggered notifications is associated with a corresponding entity location of the one or more entity locations.

19. The computing system of claim 18, wherein the program memory further stores executable instructions that cause the computing system to:

while the application is in the launched state, cause the mobile device to register one or more original location-triggered notifications, wherein causing the mobile device to register the one or more location-triggered notifications includes causing the mobile device to (i) deregister the one or more original location-triggered notifications, and (ii) register one or more new location-triggered notifications.

20. The computing system of claim 18, wherein the program memory further stores executable instructions that cause the system to:

sending a silent push notification to the mobile device, wherein causing the mobile device to deregister the one or more original location-triggered notifications and register the one or more new location-triggered notifications includes occurs in response to the silent push notification.

* * * * *